No. 682,931. Patented Sept. 17, 1901.
J. W. GREGORY.
ACETYLENE GAS MACHINE.
(Application filed Oct. 23, 1900.)
(No Model.) 2 Sheets—Sheet 1.
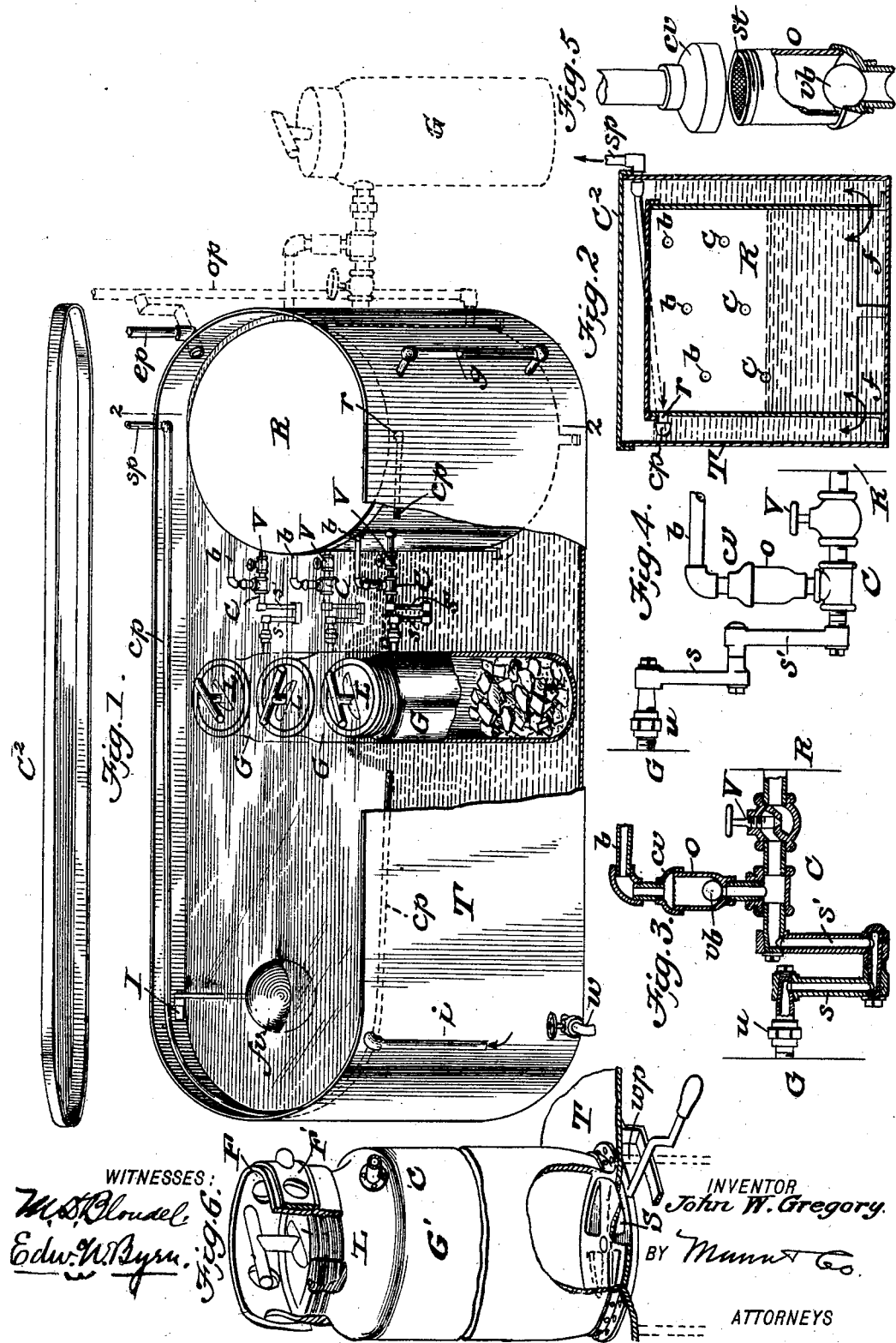
WITNESSES:
INVENTOR
John W. Gregory.
BY
ATTORNEYS No. 682,931. Patented Sept. 17, 1901.
J. W. GREGORY.
ACETYLENE GAS MACHINE.
(Application filed Oct. 23, 1900.)
(No Model.) 2 Sheets—Sheet 2.
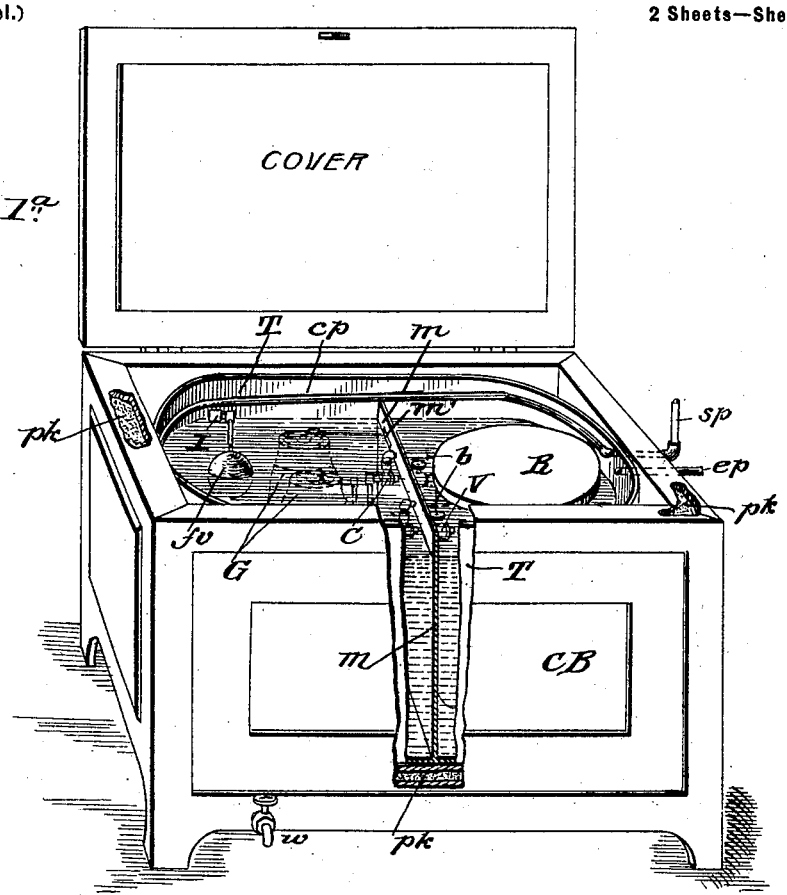
Fig. 1ª
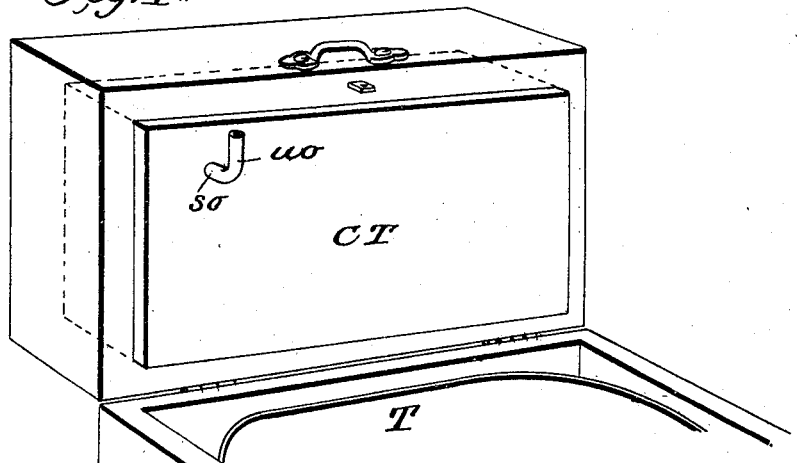
Fig. 1ᵇ
WITNESSES:
M. B. Blondel
Edw. W. Byrn.
INVENTOR
John W. Gregory.
BY Munn & Co
ATTORNEYS

UNITED STATES PATENT OFFICE.

JOHN W. GREGORY, OF ST. JOSEPH, MISSOURI, ASSIGNOR TO THE SUNLIGHT MANUFACTURING AND SUPPLY COMPANY, OF SAME PLACE.

ACETYLENE-GAS MACHINE.

SPECIFICATION forming part of Letters Patent No. 682,931, dated September 17, 1901.

Application filed October 23, 1900. Serial No. 34,015. (No model.)

*To all whom it may concern:*

Be it known that I, JOHN W. GREGORY, of St. Joseph, in the county of Buchanan and State of Missouri, have invented a new and useful Improvement in Acetylene-Gas Machines, of which the following is a specification.

My invention is in the nature of an improved automatic acetylene-gas machine; and it consists in the peculiar construction and arrangement of the various parts of the same, as hereinafter described, reference being had to the accompanying drawings, in which—

Figure 1 is a perspective view of the machine with the tank and generator broken away and the cover of the tank lifted off. Fig. 1ª is a perspective view of the tank contained in a protecting-casing. Fig. 1ᵇ is a view of a modified form of the lid. Fig. 2 is a vertical cross-section on the line 2 2 of Fig. 1. Fig. 3 is a sectional view of the extensible or swinging conduit or pipe connection between the generator and receiver. Fig. 4 is a side view of the same parts extended, as when the generator is lifted up. Fig. 5 is a detail of the gas-check valve, and Fig. 6 a broken-away view of a modified form of the generator.

The machine consists of a water-tank T, made with a removable cover $C^2$, which is preferably hinged, a gas-receiver R, made tight at top and sides and open below, in the form of a bell or inverted cup, disposed and fastened within said tank T, and one or more generators G, each connected with said receiver R by a conduit C, with various accessories, as hereinafter described in detail, and shown in Figs. 3 and 4.

In my invention the tank T may be made of any suitable material that will hold water and of any desired form, as cylindrical, oblong, cubiform, &c. Within said tank, preferably at one side, is disposed the receiver R, made of any suitable material, in the form of an inverted cup, firmly fastened in place by bolting, riveting, or soldering to the side of tank T or by any other suitable means and so disposed that the mouth or open bottom thereof is a sufficient distance above the bottom of the tank T to permit the free flow of water in and out under the edges of said receiver, as shown at $f$, Fig. 2. It may be in part supported by a foot or feet fastened to the free edge of the mouth thereof and resting upon the bottom of said tank, as shown. The generator G will consist of any suitable material and made in any desired shape to contain a quantity of calcium carbid for making gas and so arranged that water may be applied thereto and the gas thus formed allowed to escape therefrom, as hereinafter more particularly and fully described. The tank T in addition to having a removable cover may be fitted with a supply-pipe I for the purpose of supplying said tank with water by connecting same with a waterworks service-pipe or any tank or receptacle holding a sufficient supply and controlling same by the use of a float-valve $fv$, so as to keep the water at any level desired in said tank T. There is nothing new in this water-supply and I do not claim it. The water-supply devices which I claim as my invention and a part of my portable apparatus will be described hereinafter in connection with Fig. 1ᵇ. Said tank T will also be fitted with an escape or safety pipe $e\,p$, to be extended outward and preferably upward, so as to carry out into the open air any gas escaping into said tank, as hereinafter described, and preferably said tank will also have a ventilating-inlet, (which may also serve as an overflow-outlet,) as at $i$, consisting of an external pipe or flue opening above the water-line in said tank and opening externally below to assist in inducing a current of air throughout the upper part of said tank, so as to thoroughly carry off any and all gas which may escape into said tank and through which any excess of water expelled from receiver R by forming gas may overflow and escape, thus preventing undue increase of pressure upon the gas fed to burners. The tank may also be provided with an emptying-cock, as shown at $w$. The receiver R will have connected with it in or near the top of said receiver, as at $r$, a suitable outlet and cooling pipe $c\,p$, through which the gas in the receiver may be conducted to the supply-pipe $s\,p$, through which the gas may be supplied to service-pipes and burners. The pipe $c\,p$ by being disposed in the form of a worm or coil on the walls of the tank T or otherwise in addition to affording on outlet for the gas performs also the double office of cooling the gas and condensing any moisture therein, which moisture, collecting in the said pipe, (which has a uniform fall or descent toward the receiver R,) is thus caused to flow back into said receiver, this simple device thus serving as cooler and drier of the gas and to trap the water back into the tank. When desired, a gage may be connected with receiver R through the walls of tank T, as shown at *g*, so as to at all times show the water-level and the quantity of gas contained in said receiver. The generator G, as shown, consists of a vessel, cylinder-shaped or otherwise, made tight and of sufficient strength to hold carbid, water, and gas under all such pressure as it is possible to generate in my machine. It is to have an opening or mouth large enough to conveniently charge said generator with calcium carbid and to empty residuum therefrom, said mouth or opening being fitted with a snugly-fitting lid L, provided with suitable packing and which may be held securely in place by screw-threads or any other suitable means. The mouth of the generator may be at one side instead of at the top. The conduit C will preferably connect with the generator near its top and enter the receiver R at such distance below the top thereof as to give suitable pressure upon the gas accumulating in the receiver to drive it through pipes and burners for use in illumination. Said conduit may be fitted with a union *u*, Figs. 3 and 4, which may be supplied with small handles for greater ease in manipulation, so that the generator may be readily detached from the rest of the machine for convenience in carrying away to refill or for any purpose. Said conduit also has a cut-off valve V, by which the flow of water through said conduit may be controlled, and rising out of the conduit between said valve V and generator G there will be a branch *b* of said conduit extending from the conduit into the receiver R, at or near the top thereof. In said branch *b* is a valve, one form of which is shown in Fig. 5, consisting of a barrel *o* and valve-ball *v b*, with a screw cap or connection *c v*. This valve is such that it can be closed at any time to prevent the passage of gas from generator to receiver; but gas cannot flow back through said conduit branch *b* from receiver to generator. I may use any form of valve that will accomplish this purpose and may make my valve *o* by using an ordinary pipe-coupling (or elbow) for the barrel *o* and turning up a suitable valve-seat in the end of the pipe, entering same below the valve-ball *v b*. I may also provide a strainer *s t* of cotton-batting, Fig. 5, or any light packing of cotton fiber or other suitable material in the upper part of said valve *o* for the double purpose of straining out floating bits of lime and carbon from the gas and of preventing the sticking of the valve-ball in the top of said valve in any event. I may also use a similar strainer of cotton-batting or loose cotton or other fiber or material at the point where the cooling-pipe *c p* connects with the service-pipe *s p* for the purpose of more surely arresting all floating particles of lime and carbon that might still be contained in the gas. As shown in Fig. 1 in dotted lines, I may connect the generators G with receiver R from without the tank T; but I preferably set the generators inside the tank and connect from there, thus having the generator wholly or in large part immersed in the water in said tank T, and thus making use of the water to keep the generators cooled while gas is making, so as to effectually prevent polymerization of the gas and also utilizing the heat set free in generating gas to so raise the temperature of the water in the tank as to effectually prevent freezing same in winter. In a large machine this generated heat may also be utilized to raise the temperature of a root-cellar, poultry-house, kennel, stable, or other outbuilding when desired. When the generator is thus disposed within the tank and immersed in the water, I may use a hollow swing or extension connection *s s'*, Figs. 3 and 4, so that the generator may be lifted up above the surface of the water to disconnect same, the swing or extension being left projecting above the water until the generator is again snugly connected by the union *u* to conduit C, when it may be lowered to its place without allowing any water to reach the carbid in the generator except by opening valve V. Fig. 3 shows the position of parts when the generator is down, and Fig. 4 when it is lifted up. I may also connect more than one generator with a receiver, as indicated in Fig. 1, either within or without the tank, or both, and by making such connections at varying levels may arrange that two or more of such generators may be in open connection with the receiver R at the same time, yet automatically feed out in succession, as hereinafter described. Said generators may also instead of being removable be established in place, as in Fig. 6, and provided with a sufficient outlet at the bottom to be opened or closed by means of a cut-off slide S, a plug, or other mechanism and so arranged as to discharge into a waste-pipe *w p* or sewer connection and arranged to allow water to flow in at top of generator, so that the residuum may be flushed out of said generator without removing same from its place.

The operation of my invention is as follows: Valve V being closed and generator G thus disconnected from the remainder of the machine, said generator is opened by removing the lid L and a suitable charge of calcium carbid placed therein. Said lid is then snugly fastened in place, tank T is filled with water until same stands at a suitable level above the point where conduit C enters receiver R, and valve V is opened, allowing water to flow through conduit C and come into contact with the carbid in generator G. The well-known chemical action which begins as soon as water touches calcium carbid is thus set up, and the gas thus formed soon creates sufficient pressure in the generator to force the gas through conduit C and branch b into the receiver R. The outgo of gas may check the flow of water momentarily; but as soon as the gas-pressure is thus relieved the water again jets into the generator, and thus the action continues by alternating flow of gas and water until the gas collecting in the upper part of receiver R presses the water therein down below the mouth of conduit C, when, as no more water can enter the generator, the making of gas ceases until the consumption of the gas in the receiver has proceeded to that point that the water rising up therein from below again begins to enter the generator, thus resuming the production of gas. As will be observed from Fig. 2, when the water is pressed down in the receiver by the accumulation of gas above it it flows out below into the tank, thus raising the water-level in the latter; but as the area of a horizontal section of the tank is so much larger than that of the receiver the rise of water-level in the tank is inappreciable after the top of the receiver is reached, and it is designed to have the conduit C enter receiver R at such point that when the water in tank T covers the receiver it will afford the pressure desired to properly feed the gas through service-pipes to burners, and ventilating-inlet i may be so arranged as to afford a water-overflow, by means of which, in connection with float-valve f v, the water-pressure may be exactly regulated. The nature of valve o being such that gas can at all times escape from the generator into the receiver, there cannot at any time be any stronger pressure upon any part of the machine than that caused by the column of water a little above the height of the receiver, because should gas flow into the receiver until the water is pressed down to its mouth the excess gas thereafter escapes into the tank and bubbles up to the surface of the water, whence it is carried away into the open air through escape-pipe e p, the lightness of the gas and the slightly-warming influence of the water in the tank keeping up a steady current of air in at inlet i across the tank and out through pipe e p as through a flue. Instead of allowing overflow-gas from the receiver to escape through the water in the tank I may provide an overflow-pipe, (shown in outline at o p, Fig. 1,) taking out of the receiver at any desired point and connecting with pipe e p at some point above its exit from the tank. Thus not only is my machine provided with a perfect "blow-off," but the excess gas from this source or from any chance leak about any part of the machine cannot at any time collect in the chamber, cellar, or outhouse where the machine is situated so as to form an explosive compound.

The cover of the tank will preferably be hinged at one side, so as to open back and shut down tight, and the whole machine is to be inclosed in a compact frost-proof double box or case with hinged lid, as more fully described hereinafter, so as to insure perfect action in the coldest weather in any locality. When valve V is closed, the generator may be detached from conduit C and carried away to be cleaned and refilled, valve o preventing the escape of gas from the receiver through branch b. When the connection of generator with receiver is made within the tank, the swing or extension connection is preferably used, so that in removing the generator the same may be lifted up until the opening thereinto shall be above the surface of the water. While the generator is removed, the swing is left standing erect, as shown at s, Fig. 4. When again connected and lowered in place, the swing must stand substantially as shown at s, Fig. 3, so that there will be no impediment to the passing of water from receiver to generator whenever valve V is opened. When two or more generators are connected with the same receiver, as shown in Fig. 1, the entrance or connecting points of their several conduits to or with the receiver may be at different levels, as seen in Fig. 2, so that even if two or more conduit-valves V are left open at once the carbid in the several generators will "feed out" of one at a time, inasmuch as the water in the receiver rising up from below (as gas in the receiver is consumed) must always first enter the lowest opening and will not be allowed to reach a higher orifice C until gas ceases to be generated in the generator of the lower orifice C. Thus several charged generators may be left with open conduits to feed out in succession, making it practicable to completely charge the machine for long intervals. Also a generator may be removed to be recharged while another is in operation, and even if a machine has but one generator it may be removed and refilled while lights are burning by simply closing its valve V. Preferably the mouth of the conduit by which each generator enters the receiver will be covered with wire-gauze, both to prevent the entrance of any chance foreign substance that might clog valve V and more particularly to help keep the gas within the generator dry while the same is in open connection with the receiver and gas is not being consumed therefrom, thus preventing waste of carbid. When a generator is fixed in place within the tank and so arranged that its bottom may be opened into a flush-pipe or sewer connection, as hereinbefore set forth, a fender F (see Fig. 6) will be used after the lid of the generator has been removed and the same flushed out to screw down or slip over the top of the generator and press down firmly, so as to prevent the inflow of water until the interior of the generator can be dried, a fresh charge of carbid inserted, and the lid replaced. This fender may consist of such a band tightly fastened onto the generator and perforated with holes which may be opened and closed at will by an outer or inner tightly-fitting but rotatable band F', similarly perforated, and which may be shifted so as to either open or close said holes, and this valve-band may be arranged so as to open below the lid instead of above it, if desired, so that a generator may be flushed out clean before removing the lid. This location of receiver in tank T is not confined to side or end. It may be located in the middle with generators all around or in any other desired relation.

Referring now Fig. 1ª, I will describe the inclosing case. A double case or box of wood or other suitable material C B is made so as to contain tank T, the outer and inner skin of said double box being sufficiently far apart that when the space between is filled with sawdust, shavings, excelsior, or other suitable non-conducting material, as shown at broken-away portions of said double case at $p\ k$, the whole will constitute a thoroughly-efficient protection against the freezing of the water in said tank T, said case being provided with a suitable hinged cover made so as to fit snugly like the cover to an ice-box or refrigerator, that may be locked or otherwise fastened down, as may be desired. In furnishing the portable water-supply for tank T, hereinbefore referred to as taking the place of pipe I and float-valve $f\ v$, I expand the cover of tank T into a supply-tank or cover-tank C T, as shown in Fig. 1ᵇ. This consists of a flat tank made to serve as a cover to said tank T, having as its sole opening a tube $s\ o$, arranged so that when said tank-cover is turned up on its edge, as in opening up said cover, water may be poured into same through said tube, which if made of metal or other rigid material first extends out perpendicularly to its point of attachment to said cover-tank, then bends at a right angle, so as to present an upward opening $u\ o$ when said cover is raised to an open position, as shown in Fig. 1ᵇ, into which opening water may be poured, so as to freely run down into said cover-tank. That part of said tube $s\ o$ which extends perpendicularly to its connection with said cover-tank is to be of such length that when said cover-tank is shut down in place the water running down through said tube $s\ o$ from said cover-tank C T into tank T will when it reaches the level desired in tank T cover the mouth of tube $s\ o$, and thus by shutting off the ingress of air into cover-tank C T stop the downflow of water into tank T until the subsidence of the water-level in said tank T shall uncover said tube-mouth $u\ o$, and by permitting the ingress of air cause more water to descend, thus automatically maintaining the desired level of water in tank T so long as the supply in cover-tank C T lasts and the same warmth and casing which prevent the freezing of water in tank T serve the like purpose with the contents of cover-tank C T. Said tube $s\ o$ may be made of rubber or other flexible material, and instead of a single tube may consist of a pair of parallel tubes, the water being poured into the cover-tank through one and the other acting as an air-escape to facilitate the operation. There may also be a water-tight partition $m$ extending across tank T between receiver R and generator G, rising to the height at which the water is desired to stand about the receiver, (the conduit C being made to pass tightly through said partition,) so that on removal of a generator the water-level about receiver R cannot unduly subside to the detriment of the proper pressure upon the gas therein. The water may be fed from one side of this partition to the receiver R through a port $m'$ instead of over the top of the partition.

Having thus described my invention, what I claim as new, and desire to secure by Letters Patent, is—

1. An acetylene-gas apparatus, comprising a tank, a rigidly-fixed inverted bell in said tank closed at top and sides, and open at the bottom, a generator-chamber for carbid, and a conduit connecting said generator-chamber and receiver, said conduit being provided with a valve and a branch pipe with check-valve connecting the receiver to the conduit at a point between the valve in the conduit and the generator substantially as described.

2. An acetylene-gas apparatus comprising a tank for water, an inverted-bell receiver, and a generator, both immersed in the water in the tank, and the generator being connected to the receiver by a conduit having an extensible portion permitting the generator to be lifted out of the water substantially as described.

3. An acetylene-gas apparatus comprising a tank for water, an inverted-bell receiver, and a generator both immersed in the water of the tank, a conduit connecting the generator to the receiver having a swinging or jointed hollow arm, a valve in said conduit, and a branch pipe from the conduit to the receiver having a check-valve in the same substantially as described.

4. An acetylene-gas apparatus, comprising a tank, an inverted and stationary bell, arranged in said tank, a plurality of generators for containing calcium carbid said generators being connected to the receiver at different levels by conduit-pipes to cause a successive feed of water from the receivers to the generators, substantially as described.

5. In an acetylene-gas apparatus, the combination with a tank, of a generator arranged in the tank and immersed in the water thereof, said generator having a marginal fender or dam around its charging-mouth extending above the water-level to permit drying out the interior of the generator while in the tank substantially as described.

6. In an acetylene-gas apparatus, the combination with a tank for water and a level-regulating water-supply in the tank; of a generator immersed in the water of the tank and having an extended wall or fender at its upper edge projecting above the water-level, substantially as described.

7. In an acetylene-gas apparatus, the combination with a tank for water; of a generator immersed therein and having around its charging-mouth an extended wall or fender with openings in the same, and a cut-off for closing said openings substantially as and for the purpose described.

8. An acetylene-gas apparatus comprising a tank having a device for regulating the supply of water thereto, an inverted-bell receiver with cooling and drying pipe for the gas, extended in rising position around the top of the tank, an air-inlet and gas-outlet arranged above the water-level of the tank, and one or more generators immersed in the water of the tank and connected to the receiver substantially as described.

9. An acetylene-gas apparatus comprising a tank and a water-level-regulating device for supplying the same, a gas-receiver constructed as an inverted bell immersed in the water and opening at its bottom into the tank, and a generator also immersed in the water of the tank and connected to the receiver substantially as described.

10. In an acetylene-gas apparatus the combination with a main tank for water, an inverted-bell gas-receiver immersed therein, and a generator also immersed in the water and connected with the receiver; of a cover-tank having one or more tubes in the bottom thereof adapted to be immersed and sealed within the water of the main subjacent tank for automatic feed and supply as described.

11. In an acetylene-gas apparatus the combination with a main tank for water, an inverted-bell gas-receiver immersed therein, and a generator also immersed in the water and connected with the receiver; of a cover-tank connected to the top of the main tank and having at its sole opening one or more tubes let into the bottom thereof through which such cover-tank may be filled when reversed and through which opening the water may flow down into the main tank automatically when the cover-tank is down as described.

12. In an acetylene-gas apparatus, the combination with a tank; of a receiver in said tank, a generator arranged extraneous to the receiver in the tank and also immersed in the water thereof, said generator having a suitable device at or near its top for charging same with calcium carbid, and a device for opening and closing same at its bottom, so that residuum may be flushed out of said generator into a connecting flush-pipe or sewer connection without removing the generator from its place, substantially as described.

13. In an acetylene-gas apparatus, comprising a tank, a rigidly-fixed inverted-bell receiver for gas and a generator for producing acetylene gas connected therewith and devices for regulating the supply and overflow of water so as to maintain the water-level in said tank at a practically uniform point, the combination with said parts of a rigidly-fixed water-tight partition arranged in said tank to separate that portion of the tank containing the receiver from the part containing the generator and having the devices regulating the inflow of water, and reaching to such height in said tank (or having a port or ports therein at such height) that the water in the compartment of such tank in which such receiver is situated cannot fall below the desired level, even though the other compartment be wholly or partially emptied thus maintaining uniformity of pressure against the gas in such receiver, despite any fluctuation in the water-level in the other compartment of said tank, substantially as described.

14. An acetylene-gas apparatus comprising a tank, having means for regulating the supply of water thereto, an inverted-bell receiver with a cooling and drying pipe for the gas extended in a curving and rising position from its connection with said receiver, a water-tight partition dividing such tank vertically into two compartments, an opening for intake of air and overflow of water, and an outlet for waste gas arranged at and above the water-level of the tank, and one or more generators immersed in the water of the tank and connected to the gas-receiver, substantially as described.

15. In an acetylene-gas apparatus, the combination with a water-tank containing a gas-bell and generator; of a pipe or flue opening at the water-line in said tank and opening below outside for intake of air and overflow of water, and a blow-off or ventilating pipe opening at the top of such tank so that a current of air may pass into such tank and carry off waste gas through said blow-off or escape pipe, substantially as described.

16. In an acetylene-gas apparatus, the combination with a water-tank, containing a gas-bell and generator immersed in the water and having devices to regulate the water-level; of a frost-proof case inclosing the same substantially as described.

JOHN W. GREGORY.

Witnesses:
J. C. RICKETTS,
W. P. TRACY.